United States Patent
Tang et al.

(10) Patent No.: US 7,274,518 B1
(45) Date of Patent: Sep. 25, 2007

(54) OPTICAL SYSTEM FOR TAKING IMAGE (75) Inventors: Hsiang Chi Tang, Taichung (TW); Chun Shan Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/539,175

(22) Filed: Oct. 6, 2006

(51) Int. Cl.
*G02B 9/34* (2006.01)

(52) U.S. Cl. ............... 359/772; 359/773; 359/774

(58) Field of Classification Search ........ 359/771–774, 359/754–758, 763, 764, 766
See application file for complete search history.

(56) References Cited

U.S. PATENT DOCUMENTS

2007/0081259 A1* 4/2007 Noda .................. 359/774

* cited by examiner

*Primary Examiner*—Scott J. Sugarman
*Assistant Examiner*—Darryl J. Collins
(74) *Attorney, Agent, or Firm*—Banger Shia (57) ABSTRACT

An optical system comprises from the object side: a positive first lens element, a negative second lens element, a positive third lens element, a fourth lens element, and an aperture stop located between the object side of the optical system and the second lens element for controlling the brightness of the optical system. A radius of curvature R3 of a front surface of the second lens element satisfies the relation: $-0.02\ [1/\mathrm{mm}] < 1/R3 < 0.22\ [1/\mathrm{mm}]$, an Abbe number V2 of the second lens element is less than 40. A focal length of the fourth lens element is f4, a focal length of the optical system is f, they satisfy the relation: $f/f4 < 0.1$, at least one inflection point is formed on the rear surface of the fourth lens element.

17 Claims, 6 Drawing Sheets

OPTICAL SYSTEM FOR TAKING IMAGE

BACKGROUND OF THE INVENTION

1. Field of the Invention

The present invention relates to an optical system, and more particularly to a miniaturized optical system for taking image for a camera mobile phone.

2. Description of the Prior Art

In recent years, with the popularity of camera mobile phone, the image pickup lens assembly has been becoming thinner and thinner, and the photosensitive assembly of a general digital camera is nothing more than CCD (charge coupled device) or CMOS (Complementary Metal Oxide Semiconductor). Due to the advancement of semiconductor technique, the pixel size of photosensitive assembly has been being reduced continuously, and the development of the miniaturized image pickup lens assembly is toward the high resolution field. Therefore, the demand for the image quality becomes increasingly urgent.

A conventional high resolution mobile phone's optical system usually consists of four lenses and comprises a front aperture stop, wherein the first and second lens elements are two spherical lens elements glued together to become a doublet for elimination of chromatic aberration. However, the disadvantages of this conventional optical system are as follows: firstly, the arrangement of too many spherical lens elements reduces the degree of freedom of the optical system, as a result, the total length of the optical system is difficult to be shortened. Secondly, the gluing process of the glass lenses is difficult to control.

The present invention has arisen to mitigate and/or obviate the afore-described disadvantages.

SUMMARY OF THE INVENTION

To improve the image quality and effectively reduce the size of the optical system, the present invention provides a whole new four-lens type optical system.

An optical system in accordance with the present invention comprises four lens elements with refractive power, from the object side to the image side:

a first lens element with positive refractive power having a convex front surface and a concave rear surface, and at least one surface of the first lens element is aspheric;

a second lens element with negative power having a concave rear surface, and the front surface and the rear surface of the second lens element are aspheric;

a third lens element with positive power having a concave front surface and a convex rear surface, and the front surface and the rear surface of the third lens element are aspheric;

a fourth lens element having a convex front surface and a concave rear surface, the front surface and the rear surface of the fourth lens element are aspheric, and at least one inflection point is formed on the rear surface of the fourth lens element;

an aperture stop located between the object side of the optical system and the second lens element, for controlling the brightness of the optical system;

wherein the radius of curvature of the front surface of the second lens element is R3, the Abbe number of the second lens element is V2, and they satisfy the following relations:

$$-0.02[1/mm] < 1/R3 < 0.22[1/mm]$$

$$V2 < 40$$

wherein the focal length of the fourth lens element is f4, the focal length of the optical system is f, and they satisfy the following relation:

$$f/f4 < 0.1$$

The refractive power of the optical system of the present invention is mainly provided by the first lens element with positive refractive power, and the second lens element with negative power serves to balance and correct the various aberrations caused by the system. The Abbe number V2 of the second lens element satisfies the relation:

$$V2 < 40$$

The abovementioned relation can effectively correct the chromatic aberration caused by the optical system. And the Abbe number V2 of the second lens element satisfies the relation:

$$V2 < 25$$

So that the chromatic aberration generated by the optical system is further corrected and the resolution of the image can be improved.

In addition, the first lens element of the optical system of the present invention is made of plastic material and at least one surface of the first lens element is aspheric, so that the first lens element not only provides refractive power but also can correct the aberration caused by itself. To effectively correct the astigmatism generated by the optical system, the radius of curvature R1 of the front surface of the first lens element should satisfy the following relation:

$$R1 < 2.0[mm]$$

The first lens element has a strong positive refractive power, and the aperture stop is located close to the object side, so that the radius of curvature and the dimension of the first lens element become very small, and it is impossible to make such glass lenses by the use of the conventional grind method. Therefore, plastic material is introduced to make the first lens element by injection molding, producing high precision lenses with a relatively low cost. The surface of the lenses is aspheric for obtaining much more controlled variables, so as to reduce the aberration and the number of the lenses.

The first lens element provides the main refractive power for the optical system, and the aperture stop is located close to the object side, so that the exit pupil of the optical system will be far away from the image plane. Therefore, the light will be vertically projected onto the photosensitive assembly. This is the telecentric feature of the image side. And at least one inflection point is formed on the rear surface of the fourth lens element to contribute to a better correction of the off axis aberration. The telecentric feature is very important to the photosensitive power of the current solid photosensitive assembly, and can improve the photosensitivity of the photosensitive assembly while reducing the probability of the occurrence of shading.

The refractive index of the first lens element is N1, the refractive index of the second lens element is N2, and they satisfy the relations:

$$N1 > 1.54$$

$$N2 < 1.65$$

The abovementioned relations enable the optical system to have an effective refractive power. Further, the refractive index of the first lens element N1, and the refractive index of the second lens element N2 should satisfy the following relations:

$$N1<1.60$$

$$N2>1.59$$

If the refractive index of the first lens element is higher than the high limit value as mentioned above, it will be difficult to find a proper optical plastic material to match the optical system, and if the refractive index of the second lens element is smaller than the low limit as mentioned above, it will be difficult to correct the aberration.

The third lens element with positive refractive power acts as a field lens for enabling the exit pupil of the optical system to be located more far away from the image plane. When the refractive index N3 of the third lens element satisfies the relation:

$$1.54<N3<1.6$$

the third lens element will have a proper refractive power.

A fourth lens element is located behind the third lens element and its focal length is f4, the focal length of the optical system is f, they satisfy the relation:

$$f/f4<0.1$$

If the refractive power of the fourth lens element is positive, the fourth lens element serves to distribute the positive refractive power of the third lens element. These two positive lenses are arranged behind the negative second lens element and serve to suppress the occurrence of various aberrations, enabling the optical system to obtain a higher resolution.

If the refractive power of the fourth lens element is negative, and the negative fourth lens element is arranged with the third lens element in a positive/negative manner to give a telephoto structure, the back focal length and the height of the optical system can be reduced. It will be better if the fourth lens element satisfies the following relation:

$$f/f4<-1.0$$

The radius of curvature R3 of the front surface of the second lens element satisfies the relation:

$$-0.02[1/mm]<1/R3<0.22[1/mm]$$

The value of 1/R3 is set to be larger than the low limit as stated above, it will contribute to correction of the off axis aberration. If the front surface of the second lens element is convex, and the value of 1/R3 is larger than 0, the effect of aberration correction will be more ideal. However, if the value of 1/R3 is greater than the high limit value as stated above, the refractive power of the second lens element will be too great, as a result, the total length of the optical system will be excessively long.

To keep up with the trend of miniaturization of the mobile phone, the lens is also becoming more and more small. Although the present invention is a four-lens type optical system, the total length H of the optical system still should satisfy the relation:

$$H<6.1[mm]$$

It will be better if the H satisfies the relation:

$$H<5.0[mm]$$

In the optical system, the focal length of the first lens element is f1, the focal length of the second lens element is f2, the focal length of the optical system is f, and they satisfy the relations:

$$0.8<f/f1<1.6$$

$$0.5<|f/f2|<0.8$$

The total length of the optical system can be reduced effectively by increasing the refractive power of the first lens element. However, if the refractive power is too great, it will lead to an excessively high order aberration. And the negative refractive power of the second lens element comes from the rear surface and is employed to correct the aberration generated by the optical system. However, if the negative refractive power is too great, the total length of the optical system will be excessively long, and this is contrary to the goal of miniaturization of the optical system. The scope defined by the abovementioned relations can enable the present invention to achieve a balance between the size of the optical system and the aberration correction thereof.

In the optical system, the center thickness of the second lens element is CT2, the distance between the third lens element and the fourth lens element is T34, and they satisfy the following relations:

$$CT2<0.5[mm]$$

$$T34<0.2[mm]$$

These relations can effectively correct the aberration and reduce the total length of the optical system.

And it will be more ideal if the CT2 satisfies the relation:

$$CT2<0.4[mm]$$

The optical system further comprises an IR (infrared) cut filter that is located behind the fourth lens element and doesn't affect the focal length of the optical system.

The total length and the focal length of the optical system are H and f respectively, they satisfy the relations:

$$0.7[mm]<H-f<1.2[mm]$$

The optical system can maintain a good resolution on the premise of miniaturization.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1:
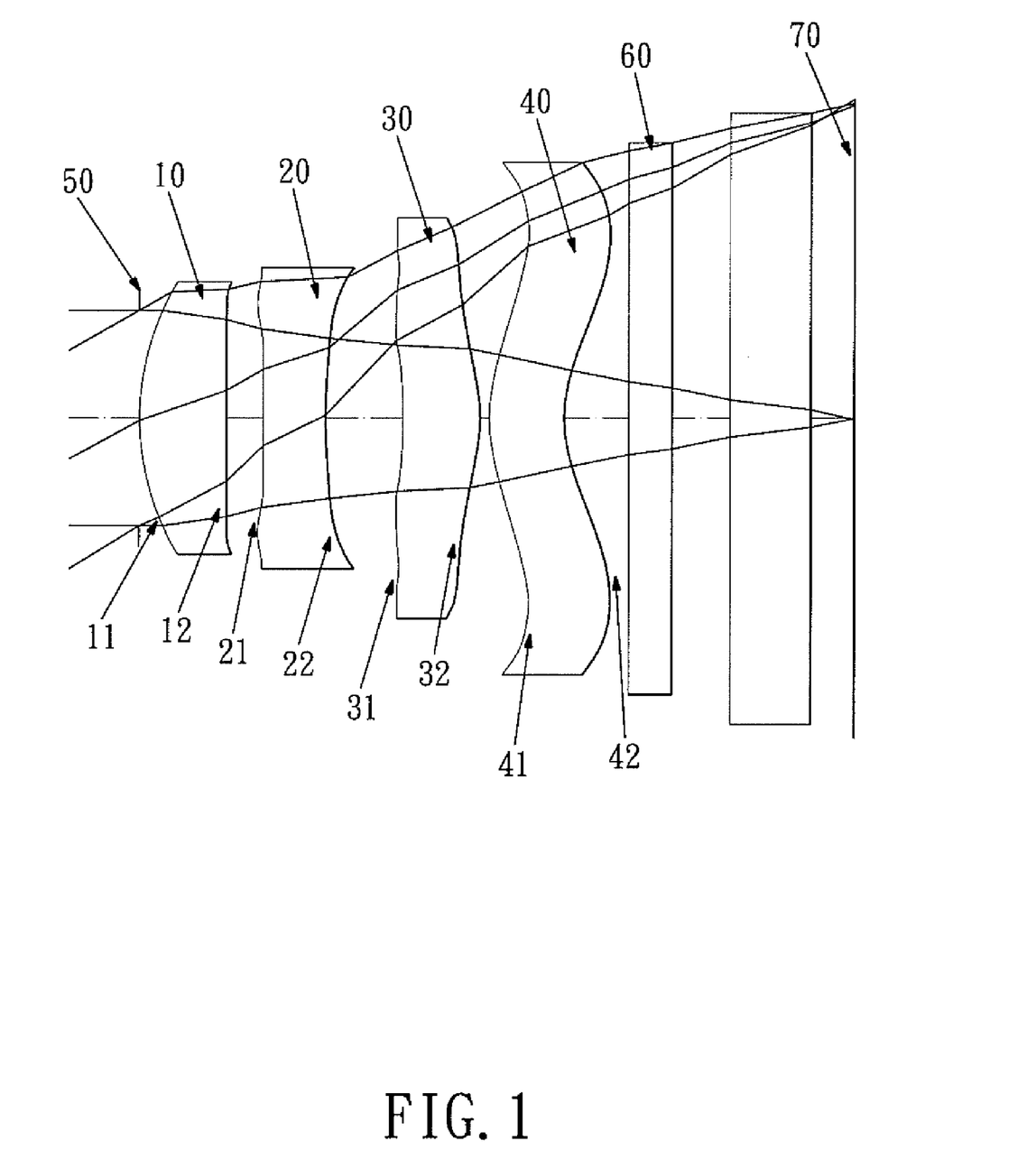
FIG. 1 shows an optical system in accordance with a first embodiment of the present invention.
Figure 2:
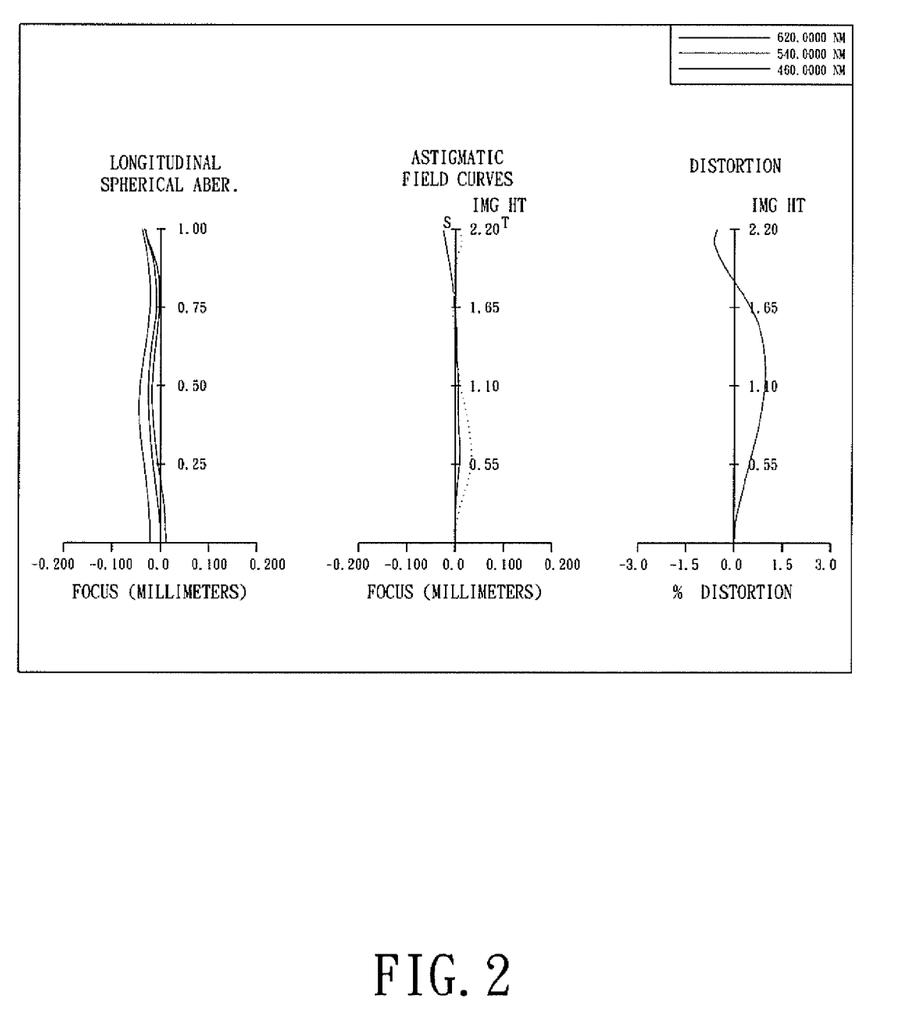
FIG. 2 shows the aberration correction of the first embodiment of the present invention.

Referring to FIG. 1, which shows an optical system in accordance with a first embodiment of the present invention, and FIG. 2 shows the aberration correction of the first embodiment of the present invention.

The optical system of the first embodiment comprises four lens elements with refractive power, from the object side to the image side:

A first lens element 10 with positive refractive power has a convex front surface 11 and a concave rear surface 12.

A second lens element 20 with negative refractive power has a concave front surface 21 and a concave rear surface 22.

A third lens element 30 with positive refractive power has a concave front surface 31 and a convex rear surface 32.

A fourth lens element 40 with positive refractive power has a convex front surface 41 and a concave rear surface 42.

An aperture stop 50 is located in front of the first lens element 10 for controlling the brightness of the optical system.

An IR cut filter 60 is located behind the fourth lens element 40 and has no influence on the focal length of the optical system.

And an image plane 70 is located behind the IR cut filter 60.

In the optical system, the Abbe number of the second lens element is V2, V2=26.6.

The first lens element 10, the second lens element 20, the third lens element 30, and the fourth lens element 40 are all made of plastic injection molding. The respective surfaces of the lenses are all aspheric, an inflection point is formed on the aspheric rear surface 42 of the fourth lens element 40, and the equation of the curve of the aspheric surfaces is expressed as follows:

$$X(Y)=(Y^2/R)/(1+\text{sqrt}(1-(1+k)*(Y/R)^2))+A_4*Y^4+A_6*Y^6+\ldots$$

wherein:

X: represents the distance of the cross section of the lens;
Y: the height from the point on the curve of the aspheric surface to the optical axis;
K: represents the conical coefficients;
$A_4, A_6 \ldots$ the aspheric coefficients of the fourth and sixth order.

The refractive index of the first lens element is N1, N1=1.543, and the refractive index of the second lens element is N2, N2=1.606, and the refractive index of the third lens element is N3, N3=1.530.

The focal length of the first lens element is f1, the focal length of the second lens element is f2, the focal length of the fourth lens element is f4, the focal length of the optical system is f, they satisfy the relations: f/f1=1.18, |f/f2|=0.79, f/f4=0.04.

The radius of curvature of the front surface of the first lens element is R1, R1=1.75798 [mm], the radius of curvature of the front surface of the second lens element is R3, and it satisfies the relation: 1/R3=−0.01 [1/mm].

The total length of the optical system is H, H=4.95 [mm], the center thickness of the second lens element is CT2, CT2=0.429 [mm], and the distance between the third lens element and the fourth lens element is T34, T34=0.07 [mm].

The total length of the optical system is H, the focal length of the optical system is f, and they satisfy the relation: H−f=1.1 [mm].

The data of the structure of the first embodiment is shown in table 1, and the aspheric data is shown in table 2, wherein the units of the radius of curvature, the thickness and the focal length are expressed in mm, and HFOV is half of the maximal field of view.

TABLE 1

(Embodiment 1)

f = 3.85 mm, Fno = 2.8, HFOV = 29.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.020 | | | | |
| 2 | Lens 1 | 1.75798 (ASP) | 0.609 | Plastic | 1.543 | 60.3 | 3.27 |
| 3 | | 99.8700 (ASP) | 0.247 | | | | |
| 4 | Lens 2 | −100.000 (ASP) | 0.429 | Plastic | 1.606 | 26.6 | −4.85 |
| 5 | | 3.07100 (ASP) | 0.534 | | | | |
| 6 | Lens 3 | −2.51471 (ASP) | 0.529 | Plastic | 1.530 | 55.8 | 8.60 |
| 7 | | −1.74459 (ASP) | 0.070 | | | | |
| 8 | Lens 4 | 1.14253 (ASP) | 0.521 | Plastic | 1.530 | 55.8 | 100.01 |
| 9 | | 0.98254 (ASP) | 0.450 | | | | |
| 10 | IR-filter | Plano | 0.300 | Glass | 1.517 | 64.1 | — |
| 11 | | Plano | 0.400 | | | | |
| 12 | Cover Glass | Plano | 0.550 | Glass | 1.517 | 64.1 | — |
| 13 | | Plano | 0.304 | | | | |
| 14 | Image | Plano | | | | | |

TABLE 2

| | Aspheric Coefficient | | |
|---|---|---|---|
| Surface 2 | k = 1.885920E−01 | A4 = 8.13905e−03 | A6 = −4.06376E−02 |
| | A8 = 5.04608E−02 | A10 = −2.48135E−04 | — |
| Surface 3 | — | A4 = −2.35664E−02 | A6 = 1.75148E−02 |
| | A8 = −4.68464E−02 | A10 = 1.44328E−01 | — |
| Surface 4 | k = −1.00000E+00 | A4 = −3.11759E−02 | A6 = −2.29712E−01 |
| | A8 = 4.19668E−01 | A10 = −1.42500E−01 | — |
| Surface 5 | k = 3.72540E+00 | A4 = 5.91267E−02 | A6 = −2.55755E−01 |
| | A8 = 2.74685E−01 | A10 = −1.05927E−01 | A12 = 2.25516E−02 |
| Surface 6 | k = −1.93123E+01 | A4 = 3.03524E−01 | A6 = −2.47497E−01 |
| | A8 = 8.81763E−02 | A10 = −8.67488E−03 | A12 = −8.94778E−03 |
| Surface 7 | k = −6.61402E−01 | A4 = 1.87630E−01 | A6 = 5.13582E−03 |
| | A8 = −3.97924E−02 | A10 = 6.98065E−03 | — |
| Surface 8 | k = −3.27334E+00 | A4 = −1.02840E−01 | A6 = 2.63414E−02 |
| | A8 = −6.22869E−03 | A10 = 4.22880E−04 | — |
| Surface 9 | k = −3.41895E+00 | A4 = −1.03449E−01 | A6 = 3.26416E−02 |
| | A8 = −1.16731E−02 | A10 = 2.23362E−03 | A12 = −2.08398E−04 |

Figure 3:
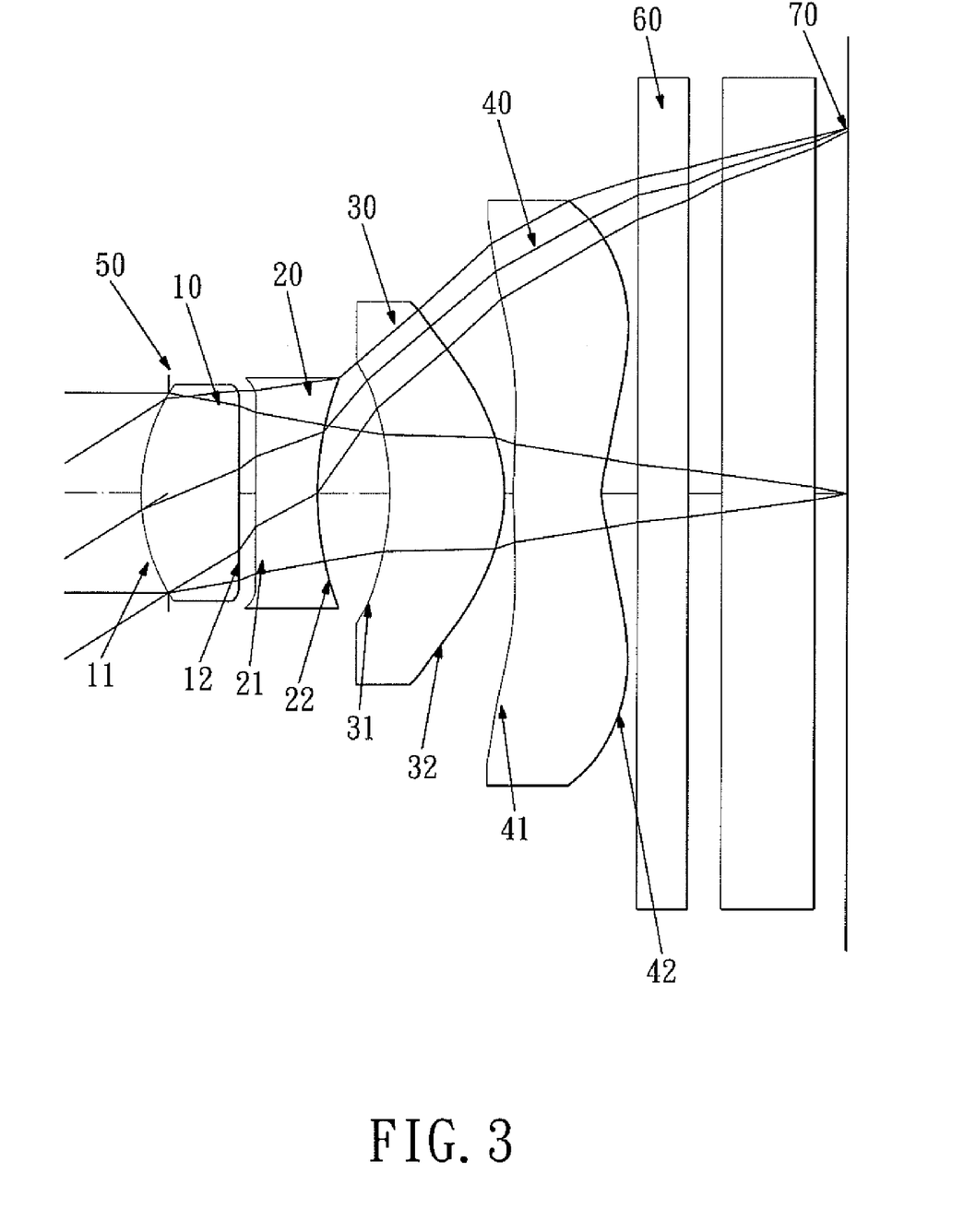
FIG. 3 shows an optical system in accordance with a second embodiment of the present invention.
Figure 4:
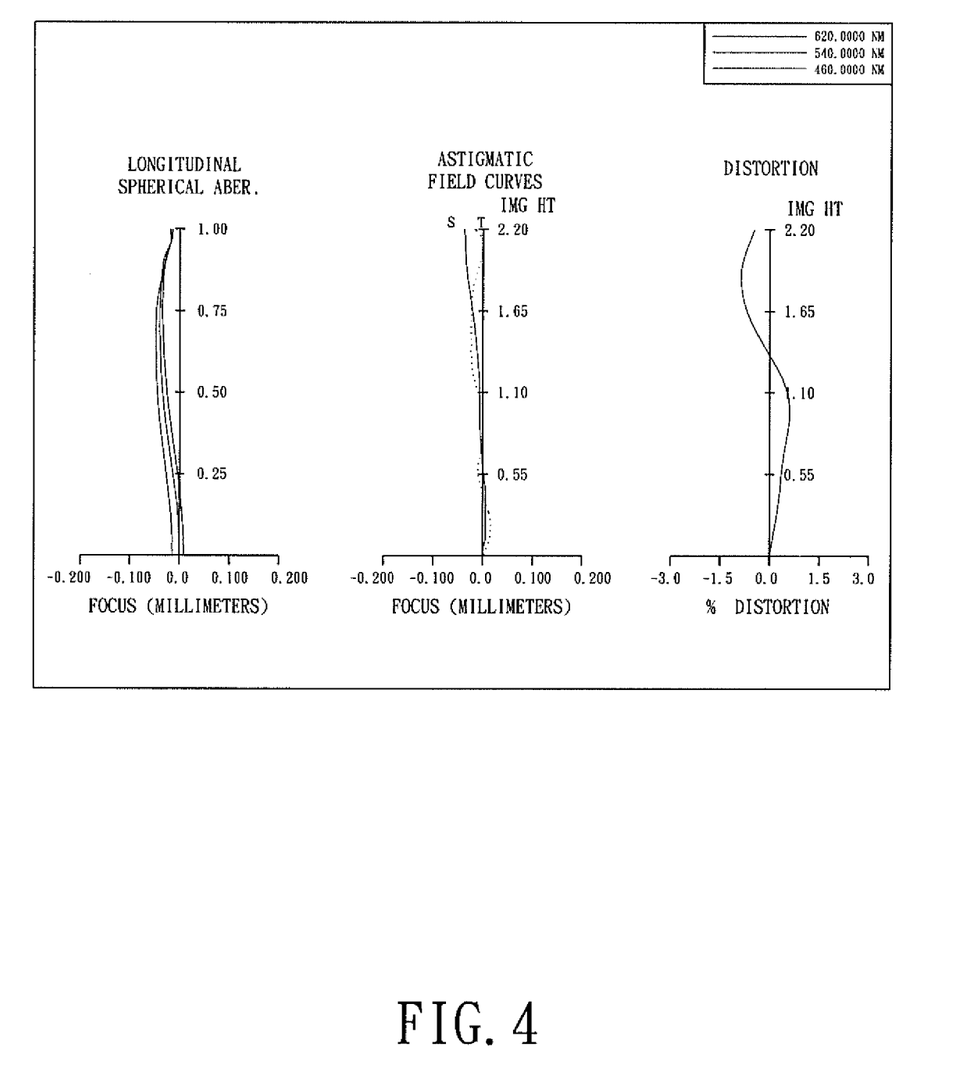
FIG. 4 shows the aberration correction of the second embodiment of the present invention.

Referring to FIG. 3, which shows an optical system in accordance with a second embodiment of the present invention, and FIG. 4 shows the aberration correction of the second embodiment the present invention. The second embodiment of the present invention is an optical system comprising four lens elements with refractive power, and the optical system comprises: from the object side to the image side:

A first lens element 10 with positive refractive power has a convex front surface 11 and a concave rear surface 12.

A second lens element 20 with negative refractive power has a convex front surface 21 and a concave rear surface 22.

A third lens element 30 with positive refractive power has a concave front surface 31 and a convex rear surface 32.

A fourth lens element 40 with negative refractive power has a convex front surface 41 and a concave rear surface 42.

An aperture stop 50 is located in front of the first lens element 10 for controlling the brightness of the optical system.

An IR cut filter 60 is located behind the fourth lens element 40 and has no influence on the focal length of the optical system.

And an image plane 70 is located behind the IR cut filter 60.

The Abbe number of the second lens element in the second embodiment is V2, and V2=23.4.

The first lens element 10, the second lens element 20, the third lens element 30, and the fourth lens element 40 are all made of plastic injection molding. The respective surfaces of the lenses are all aspheric, an inflection point is formed on the aspheric rear surface 42 of the fourth lens element 40, and the equation of the curve of the aspheric surfaces of the second embodiment is the same as that of the first embodiment.

In the second embodiment, the refractive index of the first lens element is N1, and N1=1.543, and the refractive index of the second lens element is N2, and N2=1.632, and the refractive index of the third lens element is N3, and N3=1.543.

In the second embodiment, the focal length of the first lens element with positive refractive power is f1, the focal length of the second lens element is f2, the focal length of the fourth lens element is f4, the focal length of the optical system is f, they satisfy the relations: f/f1=1.50, |f/f2|=0.84, f/f4=−1.39.

In the second embodiment, the radius of curvature of the front surface of the first lens element is R1, and R1=1.19134 [mm], the radius of curvature of the front surface of the second lens element is R3, and it satisfies the relation: 1/R3=0.063 [1/mm].

In the second embodiment, the total length of the optical system is H, and H=4.16 [mm], the center thickness of the second lens element is CT2, and CT2=0.35 [mm], and the distance between the third lens element and the fourth lens element is T34, and T34=0.05 [mm].

In the second embodiment, the total length of the optical system is H, the focal length of the optical system is f, and they satisfy the relation: H−f=0.744 [mm].

The data of the structure of the second embodiment is shown in table 3, and the aspheric data is shown in table 4, wherein the units of the radius of curvature, the thickness and the focal length are expressed in mm, and HFOV is half of the maximal field of view.

TABLE 3

(Embodiment 2)
f = 3.42 mm, Fno = 2.8, HFOV = 33.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.160 | | | | |
| 2 | Lens 1 | 1.19134 (ASP) | 0.579 | Plastic | 1.543 | 60.3 | 2.27 |
| 3 | | 25.0000 (ASP) | 0.102 | | | | |
| 4 | Lens 2 | 15.8786 (ASP) | 0.350 | Plastic | 1.632 | 23.4 | −4.06 |
| 5 | | 2.21193 (ASP) | 0.436 | | | | |
| 6 | Lens 3 | −1.68149 (ASP) | 0.684 | Plastic | 1.543 | 60.3 | 2.47 |
| 7 | | −0.85516 (ASP) | 0.050 | | | | |
| 8 | Lens 4 | 6.76530 (ASP) | 0.520 | Plastic | 1.530 | 55.8 | −2.45 |
| 9 | | 0.98254 (ASP) | 0.450 | | | | |
| 10 | IR-filter | Plano | 0.300 | Glass | 1.517 | 64.1 | — |
| 11 | | Plano | 0.200 | | | | |
| 12 | Cover Glass | Plano | 0.550 | Glass | 1.517 | 64.1 | — |
| 13 | | Plano | 0.189 | | | | |
| 14 | Image | Plano | | | | | |

TABLE 4

Aspheric Coefficient

| Surface 2 | k = −1.29455E−03 | A4 = 2.43809E−02 | A6 = −6.47654E−02 |
|---|---|---|---|
| | A8 = 2.60390E−01 | A10 = −6.19341E−01 | — |
| Surface 3 | — | A4 = 4.00945E−02 | A6 = −4.26342E−01 |
| | A8 = 3.54157E−01 | A10 = −1.6420E+00 | — |
| Surface 4 | — | A4 = 1.0000E−01 | A6 = −1.00535E+00 |
| | A8 = 1.58322E+00 | A10 = −2.9424E+00 | — |
| Surface 5 | k = 5.65906E+00 | A4 = 1.53854E−01 | A6 = −4.03672E−01 |
| | A8 = 2.63217E−01 | — | — |
| Surface 6 | k = −9.39386E−01 | A4 = 5.14498E−02 | A6 = 8.37225E−02 |
| | A8 = −3.34074E−01 | A10 = −2.27010E−01 | A12 = 4.83109E−01 |
| | A14 = 8.30877E−01 | A16 = −1.2662E+00 | — |

TABLE 4-continued

Aspheric Coefficient

| Surface 7 | k = −1.68612E+00 | A4 = 8.05537E−02 | A6 = −7.01404E−03 |
|---|---|---|---|
| | A8 = −5.03243E−02 | A10 = −3.69527E−02 | A12 = 5.19442E−02 |
| | A14 = 3.78915E−02 | A16 = −3.26736E−02 | — |
| Surface 8 | k = −8.84235E+02 | A4 = −1.07735E−01 | A6 = 3.62659E−02 |
| | A8 = −1.40265E−04 | A10 = 3.77427E−05 | A12 = −4.28707E−04 |
| | A14 = −1.26557E−05 | A16 = 1.84618E−05 | |
| Surface 9 | k = −8.61061E+00 | A4 = −1.27381E−01 | A6 = 3.91656E−02 |
| | A8 = −9.69899E−03 | A10 = 6.34494E−04 | A12 = 8.06036E−05 |
| | A14 = −3.88685E−06 | A16 = −5.45623E−07 | |

Figure 5:
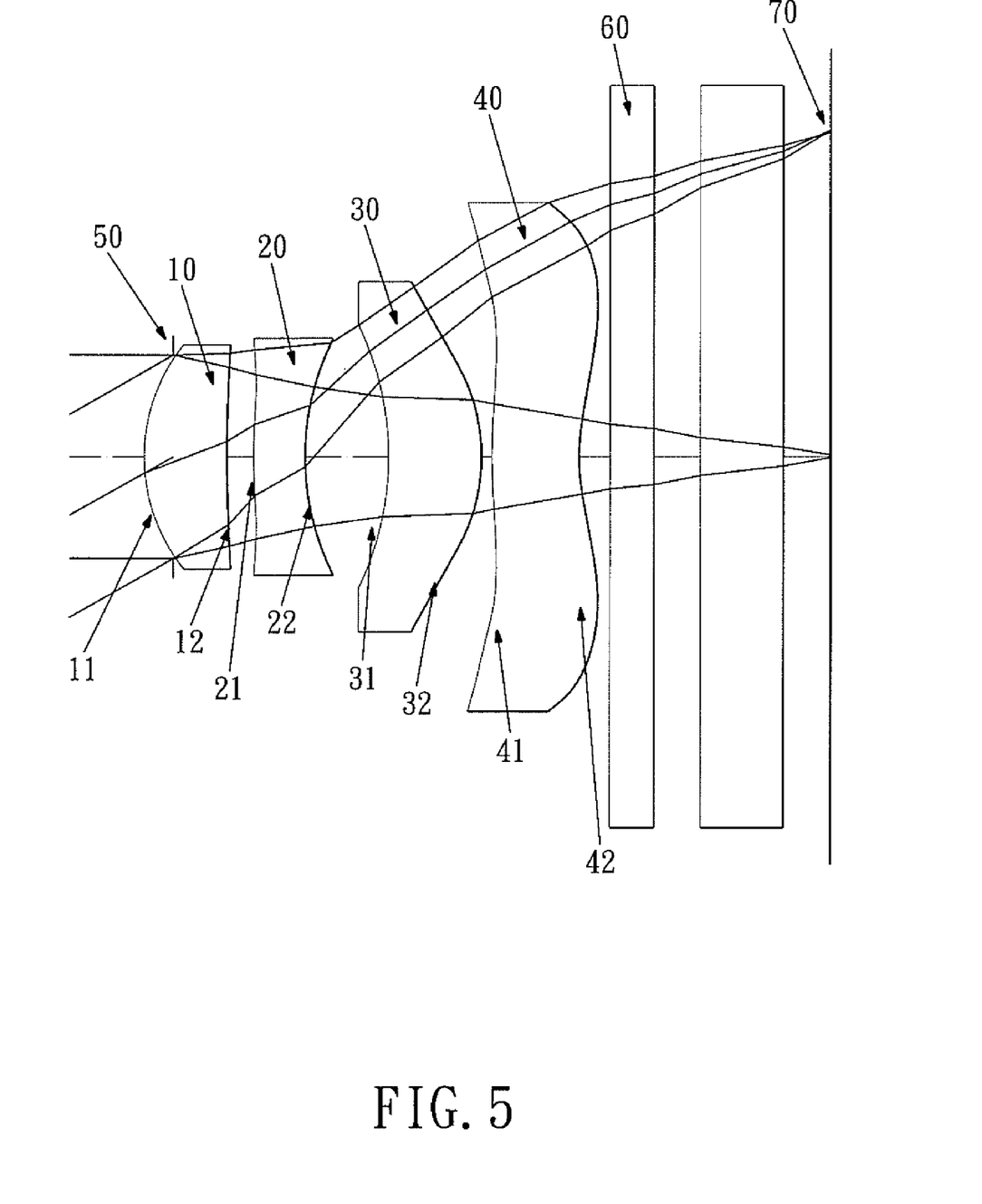
FIG. 5 shows an optical system in accordance with a third embodiment of the present invention.
Figure 6:
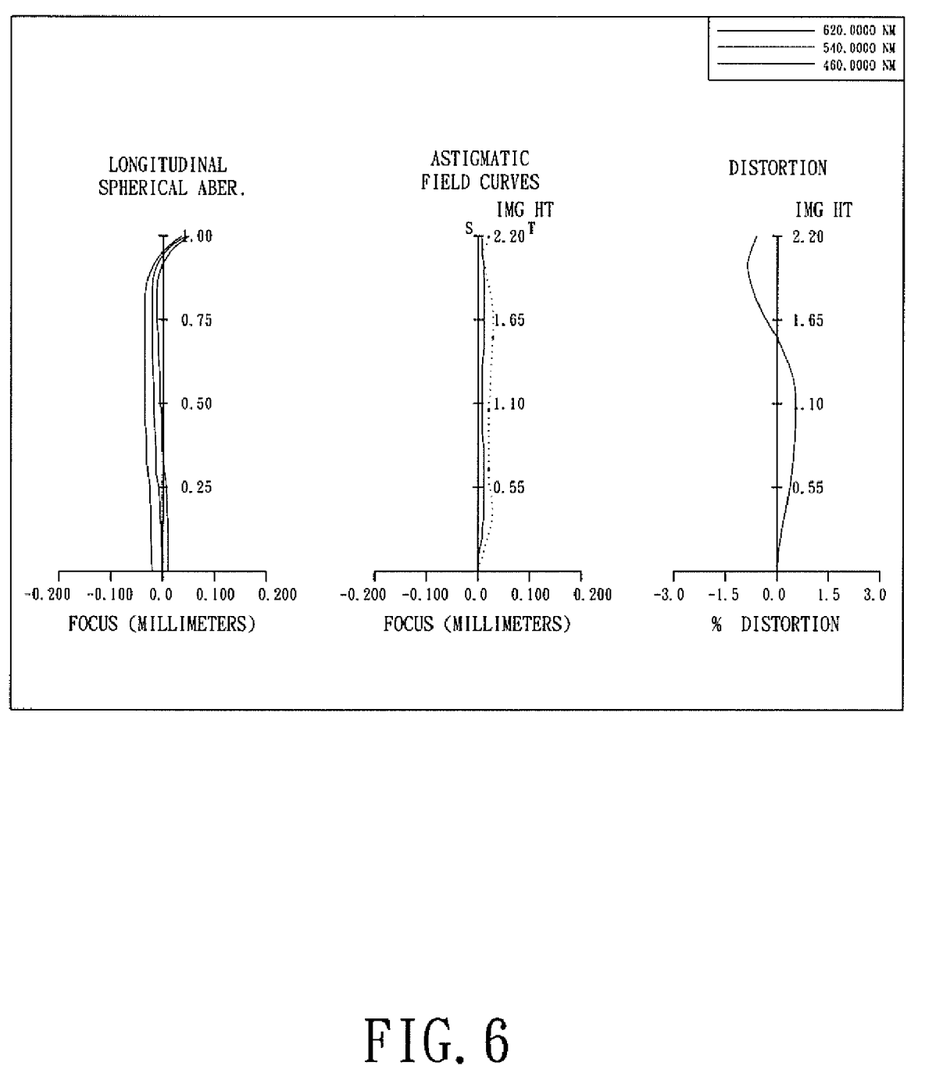
FIG. 6 shows the aberration correction of the third embodiment of the present invention.

Referring to FIG. 5, which shows an optical system in accordance with a third embodiment of the present invention, and FIG. 6 shows the aberration correction of the third embodiment the present invention. The third embodiment of the present invention is an optical system comprising four lens elements with refractive power, and the optical system comprises: from the object side to the image side:

A first lens element 10 with positive refractive power has a convex front surface 11 and a concave rear surface 12.

A second lens element 20 with negative refractive power has a convex front surface 21 and a concave rear surface 22.

A third lens element 30 with positive refractive power has a concave front surface 31 and a convex rear surface 32.

A fourth lens element 40 with negative refractive power has a convex front surface 41 and a concave rear surface 42.

An aperture stop 50 is located in front of the first lens element 10 for controlling brightness of the optical system.

An IR cut filter 60 is located behind the fourth lens element 40 and has no influence on the focal length of the optical system.

And an image plane 70 is located behind the IR cut filter 60.

The Abbe number of the second lens element in the second embodiment is V2, and V2=23.4.

The first lens element 10, the second lens element 20, the third lens element 30, and the fourth lens element 40 are all made of plastic injection molding. The surfaces of the lenses are all aspheric, an inflection point is formed on the aspheric rear surface 42 of the fourth lens element 40, and the equation of the curve of the aspheric surfaces of the third embodiment is the same as that of the first embodiment.

In the third embodiment, the refractive index of the first lens element is N1, and N1=1.543, and the refractive index of the second lens element is N2, and N2=1.632, and the refractive index of the third lens element is N3, and N3=1.543.

In the third embodiment, the focal length of the first lens element with positive refractive power is f1, the focal length of the second lens element is f2, the focal length of the fourth lens element is f4, the focal length of the optical system is f, they satisfy the relations: f/f1=1.41, |f/f2|=0.79, f/f4=− 1.03.

In the third embodiment, the radius of curvature of the front surface of the first lens element is R1, and R1=1.28930 [mm], the radius of curvature of the front surface of the second lens element is R3, and it satisfies the relation: 1/R3=0.15 [1/mm].

In the third embodiment, the total length of the optical system is H, and H=4.56 [mm], the center thickness of the second lens element is CT2, and CT2=0.35 [mm], and the distance between the third lens element and the fourth lens element is T34, and T34=0.07 [mm].

In the third embodiment, the total length of the optical system is H, the focal length of the optical system is f, and they satisfy the relation: H−f=0.726 [mm].

The data of the structure of the third embodiment is shown in table 5, and the aspheric data is shown in table 6, wherein the units of the radius of curvature, the thickness and the focal length are expressed in mm, and HFOV is half of the maximal field of view.

TABLE 5

(Embodiment 3)
f = 3.83 mm, Fno = 2.8, HFOV = 30.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.190 | | | | |
| 2 | Lens 1 | 1.28930 (ASP) | 0.542 | Plastic | 1.543 | 60.3 | 2.72 |
| 3 | | 8.33990 (ASP) | 0.182 | | | | |
| 4 | Lens 2 | 6.66110 (ASP) | 0.350 | Plastic | 1.632 | 23.4 | −4.88 |
| 5 | | 2.08074 (ASP) | 0.558 | | | | |
| 6 | Lens 3 | −1.79894 (ASP) | 0.610 | Plastic | 1.543 | 60.3 | 3.41 |
| 7 | | −1.02417 (ASP) | 0.070 | | | | |
| 8 | Lens 4 | 4.55180 (ASP) | 0.568 | Plastic | 1.530 | 55.8 | −3.72 |
| 9 | | 1.32111 (ASP) | 0.200 | | | | |
| 10 | IR-filter | Plano | 0.300 | Glass | 1.517 | 64.1 | — |
| 11 | | Plano | 0.300 | | | | |
| 12 | Cover Glass | Plano | 0.550 | Glass | 1.517 | 64.1 | — |
| 13 | | Plano | 0.325 | | | | |
| 14 | Image | Plano | | | | | |

TABLE 6

| | Aspheric Coefficient | | |
|---|---|---|---|
| Surface 2 | k = −9.76030E−03 | A4 = 2.41227E−02 | A6 = −5.68181E−03 |
| | A8 = 4.30085E−02 | A10 = −3.57922E−02 | — |
| Surface 3 | — | A4 = −1.33978E−02 | A6 = 1.83626E−01 |
| | A8 = −6.83847E−01 | A10 = 6.74718E−01 | — |
| Surface 4 | — | A4 = −5.78962E−02 | A6 = −6.67979E−03 |
| | A8 = −4.57519E−01 | A10 = 4.53943E−01 | — |
| Surface 5 | k = 2.98744E+00 | A4 = 2.53366E−02 | A6 = −1.59754E−01 |
| | A8 = 1.34695E−01 | — | — |
| Surface 6 | k = −2.20056E+00 | A4 = 5.05249E−02 | A6 = −4.93313E−02 |
| | A8 = −3.87127E−02 | A10 = −6.08436E−02 | A12 = 1.04640E−01 |
| | A14 = 4.84306E−02 | A16 = −1.68507E−01 | — |
| Surface 7 | k = −1.81946E+00 | A4 = 4.45388E−02 | A6 = 2.46404E−02 |
| | A8 = −4.95054E−02 | A10 = 9.25955E−03 | A12 = 1.22365E−02 |
| | A14 = 6.36792E−03 | A16 = −6.54502E−03 | — |
| Surface 8 | k = −2.12284E+02 | A4 = −7.22663E−02 | A6 = 1.26904E−02 |
| | A8 = −3.63374E−04 | A10 = 5.20053E−04 | A12 = 7.94364E−05 |
| | A14 = −1.71768E−06 | A16 = −1.96123E−05 | — |
| Surface 9 | k = −1.04310E+01 | A4 = −1.05764E−01 | A6 = 2.93584E−02 |
| | A8 = −8.88168E−03 | A10 = 6.93856E−04 | A12 = 2.44742E−04 |
| | A14 = −7.54694E−05 | A16 = 6.04685E−06 | — |

It is to be noted that the tables 1-6 show different data of the different embodiments, however, the data of the different embodiments is obtained from experiments. Therefore, any product of the same structure is contemplated to be within the scope of the present invention even if it uses different data. Table 7 is the data of the respective embodiments resulted from the equations.

TABLE 7

| | Ex.1 | Ex.2 | Ex.3 |
|---|---|---|---|
| f | 3.85 | 3.42 | 3.83 |
| Fno | 2.8 | 2.8 | 2.8 |
| HFOV | 29.9 | 33.0 | 30.0 |
| V2 | 26.6 | 23.4 | 23.4 |
| R1 | 1.75798 | 1.19134 | 1.28930 |
| 1/R3 | −0.010 | 0.063 | 0.150 |
| N1 | 1.543 | 1.543 | 1.543 |
| N2 | 1.606 | 1.632 | 1.632 |
| N3 | 1.530 | 1.543 | 1.543 |
| f/f1 | 1.18 | 1.50 | 1.41 |
| |f/f2| | 0.79 | 0.84 | 0.79 |
| f/f4 | 0.04 | −1.39 | −1.03 |
| H | 4.95 | 4.16 | 4.56 |
| CT2 | 0.429 | 0.350 | 0.350 |
| T34 | 0.070 | 0.050 | 0.070 |
| H−f | 1.100 | 0.744 | 0.726 |

While we have shown and described various embodiments in accordance with the present invention, it is clear to those skilled in the art that further embodiments may be made without departing from the scope of the present invention.

What is claimed is:

1. An optical system comprising four lens elements with refractive power, from the object side to the image side:
a first lens element with positive refractive power having a convex front surface and a concave rear surface, and at least one surface of the first lens element is aspheric;
a second lens element with negative refractive power having a concave rear surface, and the front surface and the rear surface of the second lens element are aspheric;
a third lens element with positive refractive power having a concave front surface and a convex rear surface, and the front surface and the rear surface of the third lens element are aspheric;
a fourth lens element having a convex front surface and a concave rear surface, the front surface and the rear surface of the fourth lens element are aspheric, and at least one inflection point is formed on the rear surface of the fourth lens element;
an aperture stop located between the object side of the optical system and the second lens element, for controlling the brightness of the optical system;
wherein the radius of curvature of a front surface of the second lens element is R3, the Abbe number of the second lens element is V2, and they satisfy the following relations:

$-0.02[1/mm]<1/R3<0.22[1/mm]$ $V2<40$ the focal length of the fourth lens element is f4, the focal length of the optical system is f, and they satisfy the following relation:

$f/f4<0.1$.

2. The optical system as claimed in claim 1, wherein the first lens element is made of plastic material, and the front surface and the rear surface of the first lens element are aspheric.

3. The optical system as claimed in claim 2, wherein an IR cut filter is located behind the fourth lens element.

4. The optical system as claimed in claim 1, wherein a refractive index of the second lens element is N2, an Abbe number of the second lens element is V2, they satisfy the relations:

$N2<1.65$ $V2<25$.

5. The optical system as claimed in claim 4, wherein the refractive index of the second lens element is N2, and it satisfies the relation:

$N2>1.59$.

6. The optical system as claimed in claim 4, wherein a refractive index of the first lens element is N1, and it satisfies the relation:

$N1>1.54$.

7. The optical system as claimed in claim 6, wherein the refractive index of the first lens element is N1, a refractive index of the third lens element is N3, they satisfy the relations:

$N1 < 1.6.$ $1.54 < N3 < 1.6$

8. The optical system as claimed in claim 2, wherein the aperture stop is located in front of the first lens element.

9. The optical system as claimed in claim 8, wherein a front surface of the second lens element is convex.

10. The optical system as claimed in claim 9, wherein the fourth lens element has negative refractive power.

11. The optical system as claimed in claim 10, wherein the focal length of the optical system is f, the focal length of the fourth lens element is f4, they satisfy the relation:

$f/f4 < -1.0.$

12. The optical system as claimed in claim 11, wherein the radius of curvature of the front surface of the first lens element is R1 and it satisfies the relation:

$R1 < 2.0 [mm].$

13. The optical system as claimed in claim 1, wherein image of an object to be shot is formed in an electronic photosensitive assembly, the total length of the optical system is H and it satisfies the relation:

$H < 6.1 [mm].$

14. The optical system as claimed in claim 13, wherein the focal length of the optical system is f, the focal length of the first lens element is f1, the focal length of the second lens element is f2, and they satisfy the following relations:

$0.8 < f/f1 < 1.6$ $0.5 < |f/f2| < 0.8.$

15. The optical system as claimed in claim 14, wherein the total length of the optical system is H, a center thickness of the second lens element is CT2, a distance between the third lens element and the fourth lens element is T34, and they satisfy the relations:

$H < 5.0 [mm]$ $CT2 < 0.5 [mm]$ $T34 < 0.2 [mm].$

16. The optical system as claimed in claim 15, wherein the total length of the optical system is H, the focal length of the optical system is f, and they satisfy the relation:

$0.7 [mm] < H - f < 1.2 [mm].$

17. The optical system as claimed in claim 16, wherein the center thickness of the second lens element is CT2 and it satisfies the relation:

$CT2 < 0.4 [mm].$

* * * * *